Jan. 5, 1937. J. SUNNEN 2,066,585
SPRING TESTER
Filed May 2, 1934 2 Sheets-Sheet 1
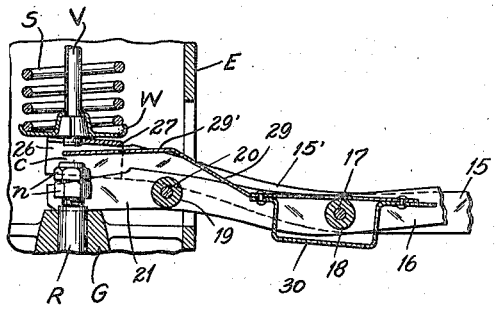
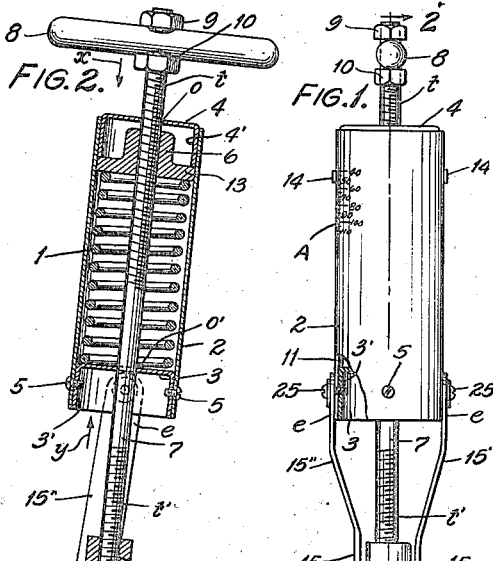
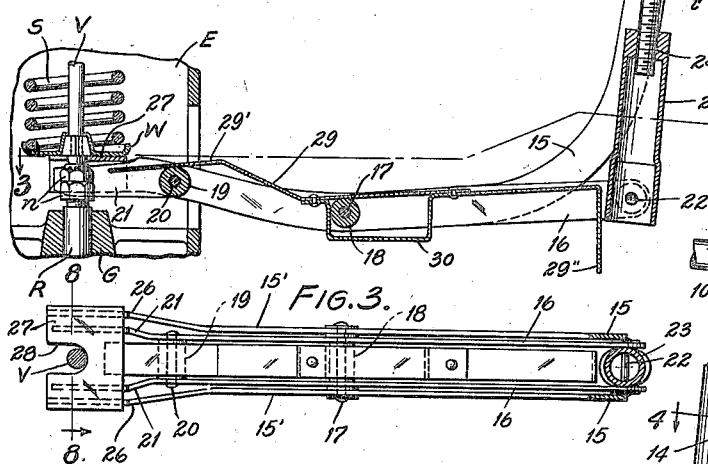
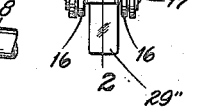
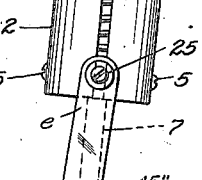
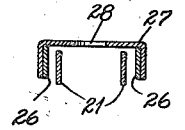
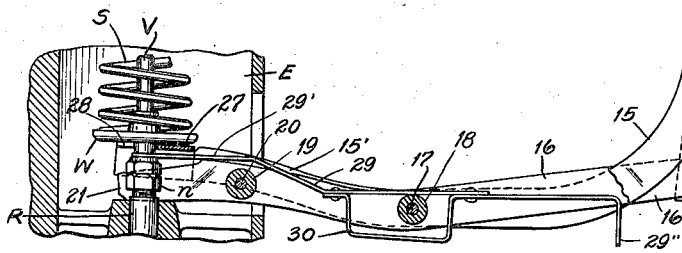
INVENTOR:
JOSEPH SUNNEN.
BY Harry [signature]
ATTORNEY.

Jan. 5, 1937. J. SUNNEN 2,066,585
SPRING TESTER
Filed May 2, 1934 2 Sheets-Sheet 2
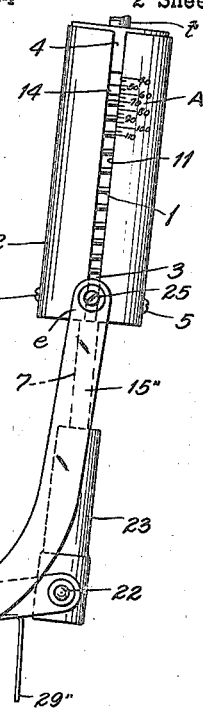
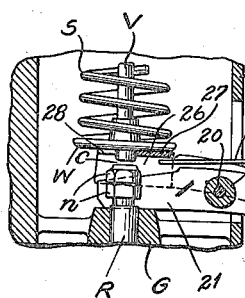
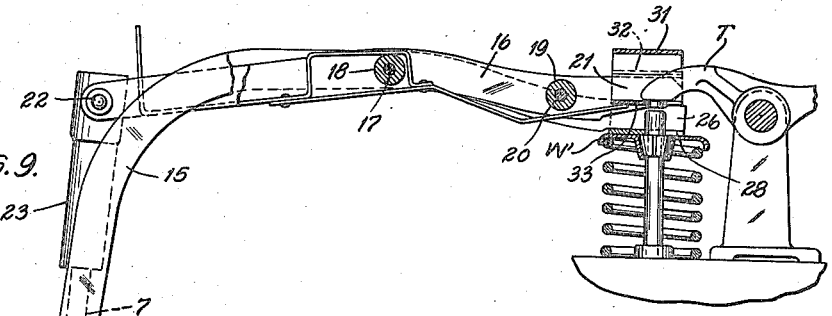
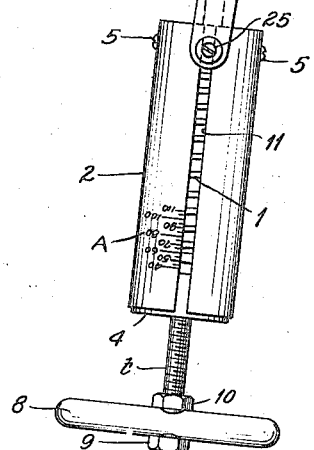
INVENTOR:
JOSEPH SUNNEN.
BY Harry A. Benner
ATTORNEY.

Patented Jan. 5, 1937

2,066,585

UNITED STATES PATENT OFFICE 2,066,585

SPRING TESTER

Joseph Sunnen, Kirkwood, Mo.

Application May 2, 1934, Serial No. 723,453

3 Claims. (Cl. 265—18)

My invention has relation to improvements in spring testers and consists in the novel features of construction more fully set forth in the specification and pointed out in the claims.

The device forming the subject-matter of this application is for the purpose of testing or weighing the compression of springs in order to determine whether or not they are serviceable for the purpose for which they are intended. Although the tester is primarily intended for use on springs used on automobiles such as valve springs and clutch springs, it is nevertheless applicable to springs in general and may be utilized to determine the spring compression in pounds of any spring falling within the range for which the tool is designed.

The principal object of the invention is to provide a spring tester that may be applied to a spring, such as an automobile valve spring, without removing the spring from the valve assembly. A further object of the invention is to provide a spring tester that will accurately determine the compression in pounds of the spring being tested. Another object of the invention is to provide a spring tester that may be accommodated to the clearance space in the valve assembly in which the tool is operated. Still further objects of the invention are to provide a spring tester embodying means for effecting a rapid adjustment to the conditions of the particular valve spring that is being tested; to provide means for gauging the normal spring compression of the spring being tested; and in general to provide a tool capable of accurately indicating spring compression, and at the same time possessing simplicity and rigidity of construction. Further and other advantages will be better apparent from a detailed description of the invention in connection with the accompanying drawings, in which:

Figure 1 is an end elevation of my improved spring tester with parts broken away; Fig. 2 is a vertical longitudinal section taken on the line 2—2 of Fig. 1 showing the spring tester applied to an automobile valve spring; Fig. 3 is a combined plan view and horizontal section taken on a plane indicated by the line 3—3 of Fig. 2; Fig. 4 is a horizontal cross-sectional detail taken on the line 4—4 of Fig. 6; Fig. 5 is a sectional view similar to that shown in Fig. 2 of the lever arms that are applied to the valve spring, said lever arms being shown in position to lift the valve assembly including the spring prior to obtaining the compression of said spring; Fig. 6 is a side elevation of the spring tester with parts broken away showing the relative position of the parts immediately preceding the obtaining of a reading of the spring compression in pounds; Fig. 7 is a side elevation of my improved tester applied to a valve spring assembly and the parts being shown in the positions when obtaining a reading of the valve spring compression; Fig. 8 is a cross-sectional detail taken on the line 8—8 of Fig. 3; Fig. 9 is a side elevation showing a spring tester applied to an overhead type of valve and a seat element applied to the end of one of the lever arms to adapt the device for application to this type of valve assembly; and Fig. 10 is a perspective view of an adapter to be applied to the ends of the levers to enable the valve spring tester to be used on the valve spring when it is used on an overhead type of valve.

Referring to the drawings, E represents that part of the engine block in which the valve assembly is mounted, said assembly comprising the valve stem V on which is secured the spring seat or retaining washer W for the valve spring S. The push-rod R operates in the usual guide G, as is well understood in the art. In designing the engine the compression of the valve spring S is fixed at some definite amount, such as forty pounds or more, in order to give the best results, and it is important that this tension be maintained approximately at this pressure in order that there will be no compression loss through the valves. However, in time the compression of the valve spring S becomes less and the efficiency of the engine falls off. The average automobile mechanic has no way of determining the compression of the valve spring S unless he removes the spring from the valve assembly and the ordinary automobile owner does not care to go to this expense unless he can be assured beforehand that the valve springs need replacing. As stated above, the object of my spring tester is to determine the compression of the valve spring S by a very simple operation without removing the spring from the valve assembly. The construction of the spring tester and the manner in which it is used is as follows:

A coiled spring 1, similar to the valve spring S, is housed within a cylindrical housing 2 having a cup-shaped bottom 3 and similar top closure 4. The bottom 3 is held in the cylinder 2 by means of screws 5, 5 passed through the cylinder wall and the flange 3' of the bottom member 3. The spring 1 is confined between the bottom member 3 and a flanged nut 6 disposed within the cylinder 2 and held against flange 4' of the top closure 4. A stem 7 traverses the cylinder 2, passing through an opening o in the closure plate 4 and the opening o' in the bottom member 3, said stem 7 having lefthand threads t extending from its outer end one-half the length of the stem and having righthand threads t' on its inner end, the lefthand threads at the outer end operating to traverse the nut 6 within the cylinder 2.

A handle 8 is fixed on the outer end of stem 7 by means of lock nuts 9 and 10. Diametrically opposed slots 11 and 12 are formed in the cylinder 2 and extend between the bottom member 3 and top closure 4, and flange 13 of nut 6 has oppositely disposed lugs 14, 14 projecting from it through the slots 11 and 12. The spring 1 is under compression between the bottom member 3 and the nut 6 in the present instance so as to exert a pressure of about forty pounds against these members that confine it. However, I wish it understood that the pressure exerted by the spring 1 may be fixed at any amount desired, depending upon the character of springs that the tool is designed to test. It will be observed (Fig. 2) that if pressure is exerted downwardly on the stem 7 in the direction of arrow x and upwardly on the cylinder 2 in the direction of arrow y the spring 1 will be compressed within narrower limits by the relative movement of the nut 6 and cylinder. Therefore, the lugs 14 will travel downwardly in the slots 11 and 12 of the cylinder 2. In order to apply the compression of the spring S to the spring 1 to effect such relative movement I connect a pair of lever arms 15, 15 to the cylinder 2 and a pair of lever arms 16, 16 to the stem 7, said pairs of lever arms being pivotally connected together by hinge pin 17, intermediate their extremities so as to form a lever of the first class. The levers 16, 16 are maintained in spaced relation by a spacing washer 18 disposed on the hinge pin 17 and a second spacing washer 19 disposed on a pin 20 adjacent to the expanded extremities 21, 21 of said levers. The opposite ends of the levers 16, 16 are secured by a pin 22 to a tubular connecting link 23 which also receives the threads t' of stem 7 in a tapped opening 24. Thus, at one end the pair of levers 16, 16 are secured to the stem 7 through the connecting link 23, and at the opposite end the pair of levers 16, 16 are expanded so that they may straddle the adjusting nuts n, n on the guide rod R when the tester is being operated.

The levers 15, 15 each have a horizontal component 15', 15' and an upright component 15'' connected by an arcuate portion. The levers 15, 15 are spaced a sufficient distance to receive between them the levers 16, 16, and the upright portion 15'' of the levers are expanded slightly at their extremities e, e to receive between them the cylinder 2 to which said extremities e are secured by means of screws 25, 25. The ends 26, 26 of levers 15, 15 adjacent to the ends 21, 21 of levers 16, 16 are also expanded and have a platform 27 secured to them as shown (Figs. 3 and 8). The platform is provided with a recess 28 to receive the end of valve stem V when the tool is applied to a spring for the purpose of testing the same. The levers 15, 15 operating as a unit and the levers 16, 16 operating as another unit may each be referred to as "lever frames", and the ends 21, 21 of lever frame 15 and the platform 27 of lever frame 16 may be referred to as "work engaging members". A space gauge 29 is disposed between levers 16, 16, said gauge having an upwardly extended forward portion 29' and a rearwardly extended handle portion 29''. The gauge rests upon the washers 18 and 19 and is provided with a confining loop 30 to hold it in place and at the same time allow for reciprocating movement. A graduated scale A is marked on the cylinder 2 adjacent to the slot 11 for the purpose of indicating the pressure of the spring S in a manner that will appear in connection with the description of the operation of the invention as follows:

Before applying the testing device to a valve spring the operator turns the handle 8 in a direction so as to bring the outer ends of the levers 15, 15 and 16, 16 together. He may then insert the ends 21, 21 and the seat 27 between the spring seat W and the guide G which forms the support for the tool in the subsequent operation.

By now rotating the handle 8 in the proper direction the ends of levers 15 and 16 are spread apart, ends 21, 21 resting upon the guide G, and the seat 27 operating to compress the valve spring S and raise the valve stem V to lift the valve (not shown) from its seat. As the spring S is compressed the spring 1 will also be compressed. This operation of compressing the spring and raising the valve from its seat serves to free the parts and at the same time provide a clearance c between the valve stem V and push-rod R. Into the clearance space c the operator now inserts the blade 29'. The next step in the operation is to rotate the handle 8 so as to bring the ends of levers 15 and 16 toward each other, thus allowing the valve spring S to expand and the stem V to approach the push-rod R. The blade 29' is now used as a gauge to obtain the correct space c between the valve stem V and the rod R, because when the operator feels a slight pressure on the blade 29' by gently moving the same forward and back he knows that his space c is correct in order to obtain a proper reading of the compression of spring S and thereupon draws the blade 29' out of the space c. By the use of the gauge 29' in this manner the spring S being tested will be compressed a definite amount for every test irrespective of the tension of the spring. The withdrawal of the blade 29' which serves as a space gauge leaves the valve spring S and the spring 1 within the cylinder 2 in a balanced condition. If the spring S has the same compression as that to which the spring 1 is loaded (in the present instance 40 pounds) there will be no appreciable compression of the spring 1 and the nut 6 will not move any appreciable distance downwardly in the cylinder 2. Hence, the lugs 14, 14 will remain at the upper ends of slots 11 and 12 to give the minimum reading on the scale A of forty pounds. However, if the compression of the spring S is greater, say fifty pounds, the spring 1 will have been compressed sufficiently in the adjusting operation, just described, to cause the lugs 14, 14 to move downwardly with the nut 6 so that they will give a reading on the scale A of fifty pounds (as indicated in Fig. 7). In other words, when a spring is tested having more tension than that of the spring 1, said spring 1 will have to be compressed more within the cylinder 2 in order to be sufficiently loaded to balance the heavier spring under test. This loading of spring 1 as above described is accomplished at the time the handle 8 is turned to separate the end of levers 15 and 16 (Fig. 5). Thus, no matter what force is exerted by the spring S (that is, within the limits, of course, for which the particular device is designed) the spring 1 will be compressed so as to have a similar compression on it which will be indicated on the scale A. If it were not for the gauge 29' which insures uniform compression the operator would have to guess at this clearance with the result that the indicated compression of the spring S would only be approximate as readings would be taken of similar springs under varying degrees of compression. Having determined the compression of the spring S the levers 15 and 16 may be released by merely turning the handle 8 to cause the outer ends of said levers to come together and allow the valve stem V to again come to rest on the push-rod R after which the tool may be easily removed.

In the modification shown in Figs. 9 and 10 my improved tester is shown applied to the overhead type of valve. In this application the ends of the levers 15 and 16 must be placed between the spring retaining washer W' and rocker arm or valve tappet T. In order that the ends 21, 21 of levers 16, 16 may engage the tappet T an adapted 31 of a general rectangular shape is provided. This adapter has flanges 32, 32 formed in its sides for resting on the upper edges of the lever extremities 21, 21 and also has a recessed seat member 33 for engaging with the tappet T. The operation of the testing device when applied to the overhead type of valve spring is the same as heretofore described except that the device is operated in an inverted position as shown.

Having described my invention, I claim:

1. A device for testing valve springs for poppet valves actuated by push rods in cooperative engagement with the valve stem, said device comprising a pair of hinged lever frames, a housing carried at one end of one of said lever frames, a spring confined in said housing, connecting elements between the spring and the other lever frame whereby the spring is compressed within the housing by a movement of the levers, work engaging members at the ends of the lever frames opposed to the ends having connection with the spring, said work engaging members operating to separate the valve stem and push rod by movement of the levers, a space gauge movably supported by one of said levers in position for insertion into the space resulting from the separation of valve stem and push rod in order that the spring may be compressed a definite amount by the testing device.

2. A device for testing the springs of valve assemblies, said device comprising a pair of hinged lever frames, cooperative work engaging members on adjacent ends of said levers, a housing fixed to the opposite end of one of the lever frames, a spring in said housing, a spring confining element in cooperative, movable relation with the housing for confining the spring, adjustable connecting elements between said confining element and the end of the other lever frame opposite to the work engaging member, means on the housing for indicating the position of the spring confining element within the housing, said work engaging members operating to separate elements of the valve assembly, and a space gauge movably supported by one of said levers in position for insertion into the space resulting from the separation of said elements in order that the spring may be compressed a definite amount by the testing device.

3. A device for testing the springs of valve assemblies, said device comprising a pair of hinged lever frames, cooperative work engaging members on adjacent ends of said levers, one of said lever frames serving as a supporting member, the other serving to separate elements of the valve assembly and compress the spring thereof, a test spring mounted between said lever frames to balance the spring being tested, means for adjusting the compression on said spring, means for indicating the compression of the test spring, and means in nesting relation with the supporting work engaging member and movable into the space resulting from the separation of said valve assembly elements in order that the valve spring may be compressed a definite amount by the testing device.

4. A device for testing the springs of valve assemblies, said device comprising a pair of hinged lever frames, cooperative work engaging members on adjacent ends of said levers, one of said lever frames serving as a supporting member, the other serving to separate elements of the valve assembly and compress the valve spring, a test spring mounted between said lever frames to balance the spring being tested, means for adjusting the compression of said spring, means for indicating the compression of the test spring, and means slidingly mounted on the supporting work engaging member for insertion into the space resulting from the separation of elements of the valve assembly in order that the valve spring may be compressed a definite amount by the testing device.

JOSEPH SUNNEN.